United States Patent Office 3,810,974
Patented May 14, 1974

3,810,974
ALUMINUM HYDRIDE PREPARATION
William M. King, Walnut, Calif., assignor to Aerojet-General Corporation, Azusa, Calif.
No Drawing. Filed May 5, 1964, Ser. No. 366,933
Int. Cl. C01b 6/00
U.S. Cl. 423—645
5 Claims

ABSTRACT OF THE DISCLOSURE

This invention relates to a novel form of aluminum hydride and a method for its preparation.

Aluminum hydride is known to be useful as a fuel in solid propellants for rocket propulsion. Until recently aluminum hydride existed only in the form of an etherate and if any attempt was made to remove the ether by heating, the aluminum hydride decomposed.

A process has recently been developed for producing a stable form of aluminum hydride in the form of a fine powder. It was found that if an excess, preferably a one mole excess, of lithium aluminum hydride was utilized in the initial reactions, the ether solution in which the reaction takes place may be removed under vacuum to obtain a stable form of aluminum hydride as a fine powder. The reaction scheme is indicated as follows:

$$AlCl_3 + 4LiAlH_4 \rightarrow 4AlH_3 + LiAlH_4 + 3LiCl$$

As indicated in the above reaction scheme, a one mole excess of lithium aluminum hydride is employed. The lithium chloride may be removed by any liquid-solid separation means such as decantation, centrifugation or filtration and the ether solution heated under vacuum to produce stable aluminum hydride powder.

Aluminum hydride in the form of a powder has very undesirable characteristics in the formation of a solid propellant. The powder tends to cake into lumps and even distribution of the aluminum hydride throughout the propellant is impossible.

It is an object of the present invention to provide stable aluminum hydride in a crystalline form.

It is a further object of this invention to provide a process for the production of aluminum hydride in a crystalline form which is less reactive chemically, is thermally more stable and possesses superior physical characteristics for the production of solid propellants.

It has been known to recover aluminum hydride powder out of an ether-toluene solution containing excess lithium aluminum hydride by distillation at reduced pressure. This is accomplished by first precipitating out aluminum hydride etherate by distillation at about 50° C. to about 65° C. until only 3 to 5 percent of the ether remains in the toluene. This system is then brought up to atmospheric pressure, and the temperature is raised to about 90° to about 100° C. The aluminum hydride etherate is then converted to aluminum hydride powder after approximately 40 minutes at about 90° to about 100° C.

The present invention resides in a method for recovering the aluminum hydride produced as disclosed in the reaction scheme discussed above, in which an improved crystalline form of aluminum hydride is recovered rather than the powdered form of the prior art as shown above.

It has been found that the retention of 8 to 10 percent of the ether after the initial distillation step results in a superior final product. The retention of this ether permits rearrangement of aluminum hydride during the conversion to the stable form of aluminum hydride. The decrepitation of the crystal is reduced and the final product is crystalline rather than the powder previously obtained. The chemical reactivity, thermal stability and bulk density are improved over the previously obtained powdered form.

In the following examples parts and percentages are by weight unless otherwise indicated.

EXAMPLE 1

400 ml. of a 1 M solution of LiAlH$_4$ in ether was added under an argon atmosphere to 100 ml. of 1 M AlCl$_3$ in ether in a 1 liter graduated cylinder. The cylinder was stoppered and shaken to mix the contents. The precipitate of LiCl was allowed to settle and the supernatent solution was pumped by argon pressure through a glass wool filter into a one liter pressure equilibrated dropping funnel. This solution was then added to 3,400 ml. of toluene under an argon atmosphere. The ether-toluene solution was completely free of precipitate. The solution was added to a 5 liter round bottom flask fitted with a stirrer, thermometer, a distillation head, and an electrically heated oil bath. The solvent was distilled according to the following schedule:

| Time, min. | Pot temp., °C. | Oil temp., °C. | Pressure, mm. Hg | Remarks |
|---|---|---|---|---|
| 0 | 25 | 100 | 200 | |
| 5 | 45 | 100 | 200 | Distillation begins. |
| 25 | 59 | 75 | 200 | Precipitation begins. |
| 30 | 59 | 75 | 760 | 8-10 ether remains. |
| 65 | 93 | 105 | 760 | |
| 75 | 98 | 110 | 760 | |
| 100 | 99 | 110 | 760 | |

The flask was cooled to room temperature and the contents were transferred to a large separatory funnel and the solid was allowed to settle. The supernatent liquid was pumped out with argon pressure and the product was washed with three 500 ml. portions of dry ether. A final 500 ml. portion of dry ether was added and the suspension was filtered through a sintered glass filter attached to the bottom of the separatory funnel with a rubber stopper, using argon pressure through the funnel. The argon stream was continued for 1 hour to dry the product which was further dried in a vacuum desiccator overnight. Mono-crystalline particles of aluminum hydride of the size up to about 30 microns in diameter were recovered.

While the preparation of aluminum hydride was carried out in the example above using aluminum chloride, it is well known that hydrogen chloride may be substituted for the aluminum chloride.

Although toluene is preferred as solvent for the distillation step, benzene and xylene may also be used although the crystals of aluminum hydride obtained using benzene and xylene are less desirable.

The procedure discussed above may be modified to obtain mono-crystalline chunks of aluminum hydride by carrying out the initial distillation step at a temperature between about 65° C. and about 85° C. rather than at about 50° C. to about 65° C.

The distillation may be carried out between about 50° C. and about 65° C. At the lower end of this range, on the order of about 50° C. to about 65° C. the intermediate etherate forms and is converted to the stable aluminum hydride. However, at the upper end of this range on the order of about 65° C. to about 85° C., the etherate form of aluminum hydride is bypassed and a stable form precipitates immediately. In this upper range even less decrepitation occurs and larger chunks of stable aluminum hydride are recovered.

EXAMPLE 2

An ether solution of aluminum hydride was prepared as disclosed in Example 1 above. The solution was added to 3,400 ml. of toluene and the ether-toluene solution was distilled from a 5 liter flask equipped with a thermometer, stirrer, take-off head and oil bath according to the following schedule:

| Time, min. | Pot temp., °C. | Oil temp., °C. | Pressure, mm. Hg | Remarks |
|---|---|---|---|---|
| 0 | 25 | 120 | 360 | |
| 10 | 62 | 100 | 360 | Distillation begins. |
| 30 | 75 | 95 | 360 | Precipitation begins. |
| 32 | 75.5 | 95 | 760 | 8–10% ether remains. |
| 50 | 90 | 110 | 760 | |
| 65 | 99 | 110 | 760 | |
| 90 | 99 | 110 | 760 | |

The flask was cooled and the contents transferred to a separatory funnel. The ether-toluene solution was withdrawn after the solid had settled. The solid was washed with 3 successive 500 ml. portions of ether and the ether was decanted until it remained clear during the washing. The product was then collected on a sintered glass filter and dried with an argon stream for one hour and then under vacuum overnight. The yield was a monocrystalline form of aluminum hydride in which the crystals were the size of about 30 to 50 microns in diameter.

A large excess of solvent, i.e. toluene, is employed in the distillation procedure—at least three, preferably at least five times the volume of the ether solution. For best results the solvent is substantially dry, that is, contains less than about .1% water and preferably is even drier.

The pressure and temperature at which distillation of the ether is conducted may vary, the important feature being raising the temperature for conversion while about 8 to 10 percent of ether remains in solution.

The pressure during distillation may vary from about 175 mm. Hg to about 500 mm. Hg, a lower pressure being required at lower temperatures, and during conversion preferably atmospheric pressure is employed.

The temperature during distillation may vary from about 50° C. to about 85° C., and during conversion from about 90° C. to about 100° C.

Having fully described the product, its method of preparation and its utilities, it is desired that the invention be limited only within the lawful scope of the appended claims.

I claim:

1. A process for producing aluminum hydride of an improved stable crystalline form, said process comprising:

(1) reacting $AlCl_3$ with $LiAlH_4$ with the $AlCl_3$ being present in one mole per about four moles of the $LiAlH_4$ in an ether solvent to form an ether solution of $AlH_3$ and a precipitate of $LiCl_3$;

(2) separating the $LiCl_3$ precipitate from the ether solution;

(3) mixing the ether solution with an aromatic solvent, said aromatic solvent being present in at least three volumes per volume of ether solution, and carrying on a distillation under a subatmospheric pressure of about 175 mm. Hg to about 500 mm. Hg and at a temperature in the range of about 50° C. to about 85° C. until the ether is present in the distillant in an amount of about 8 to about 10 percent;

(4) discontinuing the subatmospheric distillation and raising the temperature of the distillant to convert the aluminum hydride to a stable form; and (5) recovering a stable aluminum hydride product.

2. A process in accordance with claim 1 wherein the aromatic solvent employed is toluene.

3. A process in accordance with claim 1 wherein the subatmospheric distillation is carried on at a temperature in the range of about 50° C. to about 65° C.

4. A process in accordance with claim 1 wherein the subatmospheric distillation is carried on at a temperature in the range of about 65° C. to about 85° C.

5. A process in accordance with claim 1 wherein the conversion to the stable aluminum hydride form is carried on at a temperature of about 90° C. to about 100° C.

References Cited

UNITED STATES PATENTS

| 2,567,972 | 9/1951 | Schlesinger | 23—204 |

FOREIGN PATENTS

| 1,282,803 | 1961 | France | 23—204 |
| 1,039,041 | 1958 | Germany | 23—204 |

OTHER REFERENCES

"Non-solvated Aluminum Hydride," Rice, Aug. 1, 1956, Technical Report to the Office of Naval Research, Contract ONR–494(04) pp. 1–5.

LELAND A. SEBASTIAN, Primary Examiner

U.S. Cl. X.R.

149—109